April 6, 1943.  R. L. WILCOX  2,315,994
CHIP CONTROL MECHANISM
Filed May 18, 1942
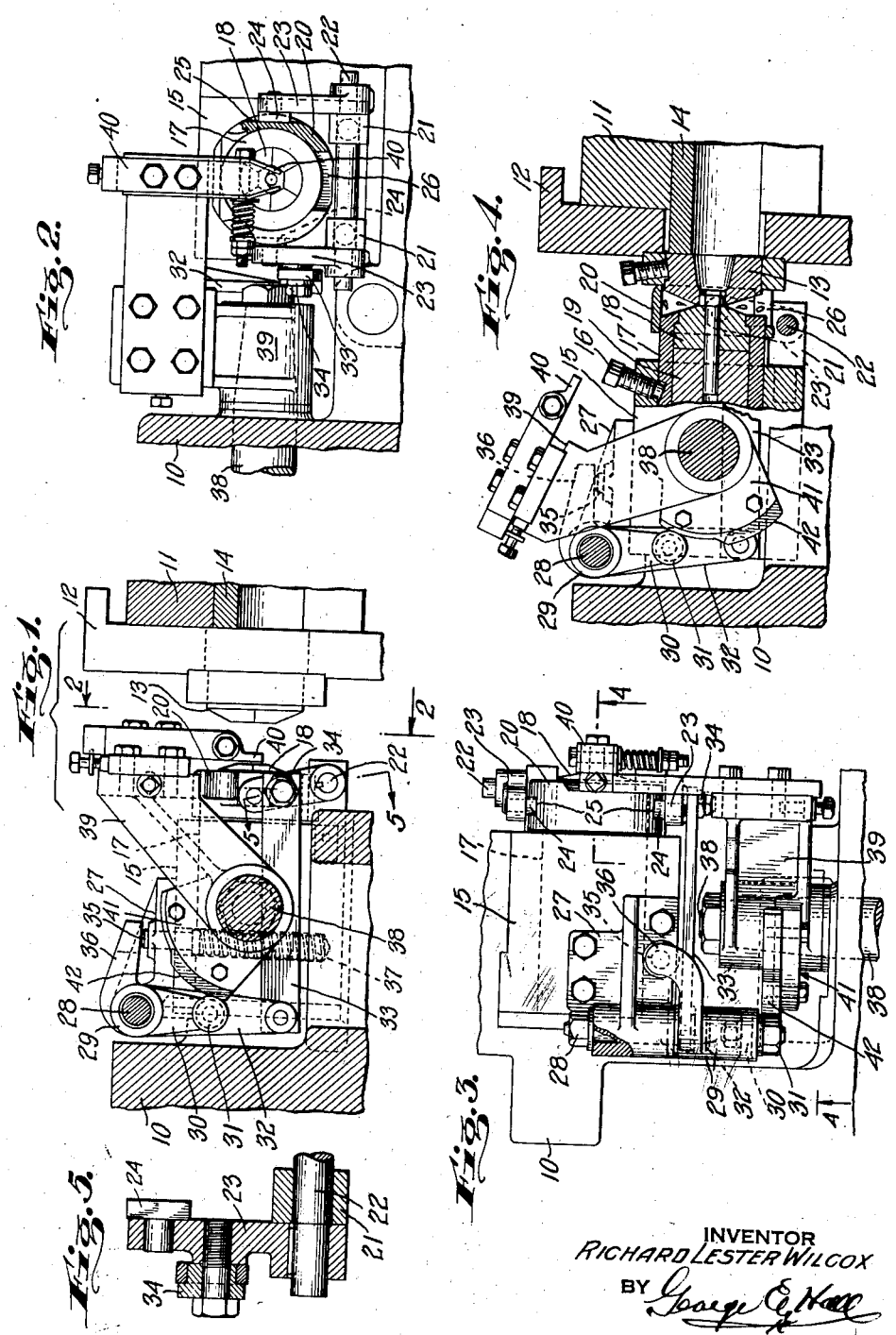
INVENTOR
RICHARD LESTER WILCOX
BY
ATTORNEY Patented Apr. 6, 1943

2,315,994

UNITED STATES PATENT OFFICE 2,315,994

CHIP CONTROL MECHANISM

Richard Lester Wilcox, Waterbury, Conn., assignor to The Waterbury Farrel Foundry and Machine Company, Waterbury, Conn., a corporation of Connecticut Application May 18, 1942, Serial No. 443,405

26 Claims. (Cl. 10—24)

This invention relates to new and useful improvements in chip control mechanism.

The principal object of the invention is to provide mechanism that will limit the flight of chips cut from a workpiece to a confined chamber open at the lower side, toward which the chips are directed for escape by gravitational movement into a stream of chips that accumulate in a convenient receptacle; a further object being to move this chip control mechanism into and out of a position relative to the cutting tools and thereby permit the feed of workpieces to such tools without forming an obstruction thereto. Other objects will become apparent from the following description and the accompanying drawing.

Referring to the drawing, which illustrates a preferred embodiment of the invention, and wherein like numerals of reference indicate like parts in the several figures;

Figure 1 is a side elevation of a die block and punch holder assembled with a trimmer or the like, and the gate with the trimming die assembled therewith;

Figure 2 is a front elevation of the die block and punch holder shown in Figure 1 looking toward the line 2—2;

Figure 3 is a plan view of the mechanism as shown in Figure 2;

Figure 4 is a sectional side view of the parts shown in Figure 1, the parts in section being taken generally upon line 4—4 of Figure 3; and Figure 5 is a sectional detail of a portion of the sleeve control mechanism, the parts in section being taken generally upon line 5—5 of Figure 1.

In chip control mechanisms heretofore constructed the guard or similar part that provides the confining walls for the chips is fixed with respect to the cutting tool and necessarily must project beyond the face of the cutting tool with which it is secured.

With some types of trimmers such a chip control mechanism is an obstruction to the feed of workpieces to the cutting tools. This difficulty is overcome in this invention by providing a chip control member that slides with respect to the cutting tools. In its retracted position it is out of the path of the workpiece as fed to the cutting tools. When the feed mechanism has presented the workpiece to the cutting tool and is withdrawn therefrom, the chip control member is moved into a position where it partially surrounds the edges of the cutting tool or tools. In these and other ways the chip control mechanism herein disclosed is adapted for a much wider use under more varied conditions than is the type wherein the chip control mechanism is secured in a permanent position relative to one of the cutting tools.

In the drawing; 10 designates the fragmentary portion of a frame of a trimmer or the like; and 11 the gate which has a reciprocating movement. Upon the face of the gate is a punch slide 12, in which is secured a trimming die 13 backed up by the sleeve 14.

Held within the frame 10 is a die block 15, and secured therein by a screw 16 or the like is a punch sleeve 17 within which is a punch or trimming tool 18 and an extruding die 19. This sleeve 17 extends beyond the front face of the die block 15 and upon which is slidably mounted a chip control member 20 or the like, mounted to slide back and forth thereon. This member 20 is in the form of a ring with an opening 26 in the bottom wall thereof that provides means for the chips to gravitate therethrough.

On the front face of the die block are two poppets 21, which provide bearings for a rock shaft 22. Upon the opposite ends of this rock shaft are the lever arms 23, each carrying a shoe block 24 which fits and slides in a groove 25 in opposite walls of the chip member 20. The poppet 21 may be made integral with the die block if desired.

Fixed to the die block 15 is a bracket 27, in which is a bolt 28, upon which is journaled a rock lever 29, having an arm 30, carrying a cam roll 31, and another arm 32, which is connected to one of the arms 23 by a link 33. The connection between this link and arm is by an adjustable eccentric bushing 34, constructed and operating in a well known manner, whereby the relative position of the lever arms 23 with the link 33 may be varied within a limited range.

Mounted within the bracket 27 is a spring pin 35, urged outwardly against an arm 36 on the rock lever 29 by a spring 37, within a hole in the die block 15.

Fixed on a rock shaft 38, journaled in a fixed part, is a transfer arm 39, having a transfer finger 40 adjustably secured thereto and provided with an arcuate arm 41, with a cam 42 upon its outer edge and against which the cam roll 31 is held by the action of the spring 37 and spring pin 35. This transfer arm is of the type shown in Patent No. 1,832,164, to R. L. Wilcox, for Trimmer, dated November 17, 1931, and is shown in Figure 4 in its workpiece receiving position, from which it carries a workpiece into line with the opening in the die 13 and punch 18, at which time the chip guard 20 is in its retracted position, the rear face thereof being adjacent to the wall of the die block, substantially as shown in Figures 1 and 3. When the parts are in this position the gate 11, with the trimming die 13, moves toward the punch 18 and pushes the workpiece into the punch 18. When the shank of the workpiece has entered the opening in the punch 18, the transfer arm 39, with its carrying fingers thereon, moves upwardly, clearing the advancing trimming die 13. As the transfer arm continues its upward movement the cam 42, through the rock lever 29 and link 33, moves the lever arms 23 outwardly, carrying with them the chip control member which slides or telescopes over the punch sleeve 17, thereby enclosing the open space surrounding the cutting edges of the tools, with the exception of the opening 26 through the underside thereof. The chips as they fly outwardly from the cutting tools strike the inside face of the chip member 20 and are deflected downwardly and by gravity drop through the opening 26 in a stream of chips, preferably into a receptacle conveniently arranged to receive them. As the gate moves away from the die blocks, the timing of the parts is such that the chip control member 20 is moved to its retracted position and another workpiece presented to the cutting tools and the operations repeated, as before.

By the mechanism disclosed herein full advantage of a chip guard is obtained without interfering with the transfer of workpieces from a hopper or similar mechanism to the trimming tools.

Within the scope of the appended claims changes and alterations may be made within the spirit of the invention.

What is claimed is:

1. In combination with tools which cooperate to cut one or more chips from a workpiece, having an open space surrounding the point of severance of the chips; a member outside one of the tools and substantially concentric therewith, having movement with relation thereto which in one of its positions projects into said open space and forms an enclosed wall around a portion thereof at said point of severance, that portion of the space not enclosed being below the said point of severance.

2. A mechanism for trimming a wrkpiece by cutting chips therefrom, which includes trimming members, with the point of trimming in part surrounded by an open space, plural wall members outside one trimming member, that limit the flight of chips within said open space formed by the action of the trimming members, the opposite ends of the walls being spaced from each other below the point of trimming and between which the chips escape from the open space around the trimming members by gravitational movement; a support for one of the trimming members; and means in part on the support for independently moving the wall members with respect thereto.

3. A mechanism for trimming a workpiece by cutting one or more chips therefrom, having coaxial trimming members with an open space therearound, a wall member outside one trimming member and movable relatively thereto, that in one position partially projects into said open space and partly surrounds the point of trimming, for limiting the flight of chips within said open space, and having an outlet below the point of trimming, whereby to provide for gravitational escape of the chips from said open space, a support for one trimming member and means in part carried by the support to reciprocate the wall member relative to its support.

4. Mechanism for trimming a workpiece, including trimming members with an open space therearound, and means for transferring workpieces into line therewith; the combination therewith of means for intercepting the flight of chips formed by the action of the trimming members on the workpiece and directing the discharge thereof by gravitational movement, comprising in part a member surrounding one of the trimming members, projected into said open space and forming an arcuate wall around the point of trimming by the trimming members, and means for moving the member in relation to the trimming members when the transfer means is outside of said open space.

5. Mechanism for trimming a workpiece, including trimming members with an open space therearound, and means for transferring workpieces into line therewith; the combination therewith of means for intercepting the flight of chips formed by the action of the trimming members on the workpiece and directing the discharge thereof by gravitational movement, comprising in part a member surrounding one of the trimming members, projected into said open space and forming an arcuate wall around the point of trimming by the trimming members, and means for moving the member in relation to the trimming members, substantially parallel with the path of movement of the trimming members when the transfer means is outside of said open space.

6. Mechanism for trimming a workpiece, including trimming members with an open space therearound, and means for transferring workpieces into line therewith; the combination therewith of means for intercepting the flight of chips formed by the action of the trimming members on the workpiece and directing the discharge thereof by gravitational movement, comprising in part a member surrounding one of the trimming members, projected into said open space and forming an arcuate wall around the point of trimming by the trimming members; and means, including in part said transfer means, for moving the member in relation to the trimming members when the transfer means is outside of said open space.

7. Mechanism for trimming a workpiece, including trimming members with an open space therearound, and means, as a rock member, for transferring workpieces into line therewith; the combination therewith of means for intercepting the flight of chips formed by the action of the trimming members in the workpiece and directing the discharge thereof by gravitational movement, comprising in part a member surrounding one of the trimming members, projected into said open space and forming an arcuate wall around the point of trimming by the trimming members, and means, actuated from the said rock member, for moving the member in relation to the trimming members when the transfer means is outside of said open space.

8. A mechanism for trimming a workpiece, including trimming members, with an open space therearound, and means for transferring workpieces into line therewith; the combination therewith of means for intercepting the flight of chips formed by the action of the trimming members on the workpiece and directing the discharge thereof by gravitational movement, comprising in part a member surrounding one of the trimming members, projected into said open space and forming an arcuate wall around the point of trimming by the trimming members; and means, comprising in part a cam, for moving the member in relation to the trimming members when the transfer means is outside of said open space.

9. Mechanism for trimming a workpiece, including trimming members with an open space therearound, and means for transferring workpieces into line therewith; the combination therewith of means for intercepting the flight of chips formed by the action of the trimming members on the workpiece and directing the discharge thereof by gravitational movement, comprising in part a support member; a chip guard thereon; and means for moving the chip guard in relation to the support member and whereby it may be projected into said open space and form an arcuate wall around the point of trimming by the trimming members.

10. The combination with cooperating trimming tools; of an element supporting one of the tools; a chip guard, having one open side, on the supporting element; means for imparting a reciprocatory movement to the chip guard on said element, whereby the chip guard in one of its positions will project beyond the operating face of the supported trimming tool and in another of its positions being in rear thereof.

11. In mechanism of the character described, the combination with a die block or the like; of a sleeve therein, a portion of which projects beyond one face thereof; a trimming member in the sleeve; a chip guard upon that portion of the sleeve projecting beyond the die block; and means for imparting movement to the chip guard on the sleeve toward and away from the die block.

12. In mechanism of the character described, the combination with a die block or the like; of a sleeve therein, a portion of which projects beyond one face thereof; a trimming member in the sleeve; a chip guard upon that portion of the sleeve projecting beyond the die block; and means for imparting movement to the chip guard on the sleeve toward and away from the die block, comprising in part a rock member journaled with respect to the die block; and a connection between the rock member and the sleeve.

13. In mechanism of the character described, the combination with a die block or the like; of a sleeve therein, a portion of which projects beyond one face thereof; a trimming member in the sleeve; a chip guard upon that portion of the sleeve projecting beyond the die block; means for imparting movement to the chip guard on the sleeve toward and away from the die block, comprising in part a rock member journaled with respect to the die block; a connection between the rock member and the sleeve; a rock lever; a link between the rock member and rock lever; and a cam actuating the rock lever in timed relation with the movement of the chip member.

14. In mechanism of the character described, the combination with a die block or the like; of a sleeve therein, a portion of which projects beyond one face thereof; a trimming member in the sleeve; a chip guard upon that portion of the sleeve projecting beyond the die block; means for imparting movement to the chip guard on the sleeve toward and away from the die block, comprising in part a rock member journaled with respect to the die block; a connection between the rock member and the sleeve; a rock lever; a link between the rock member and rock lever; a cam actuating the rock lever in timed relation with the movement of the chip member in one direction; and resilient mechanism for actuating the rock lever in the opposite direction.

15. The combination with cooperating trimming tools; of an element supporting one of the tools; a chip guard, having one open side, on the supporting element; means for imparting a reciprocatory movement to the chip guard on said element, whereby the chip guard in one of its positions will project beyond the operating face of the supported trimming tool and in another of its positions being in rear thereof, comprising in part a rock member below the chip guard.

16. In mechanism of the character described, the combination with a die block or the like; of a sleeve therein, a portion of which projects beyond one face thereof; a trimming member in the sleeve; a chip guard upon that portion of the sleeve projecting beyond the die block; means for imparting movement to the chip guard on the sleeve toward and away from the die block, comprising in part a rock member; a rock lever spaced therefrom; and an intermediate oscillating cam for actuating said rock lever and rock member.

17. In mechanism of the character described, the combination with a die block or the like; of a sleeve therein, a portion of which projects beyond one face thereof; a trimming member in the sleeve; a chip guard upon that portion of the sleeve projecting beyond the die block; means for imparting movement to the chip guard on the sleeve toward and away from the die block, comprising in part a rock member; a rock lever spaced therefrom; an intermediate oscillating cam for actuating said rock lever and rock member; and an arm having an operative connection between the rock member and rock lever.

18. Mechanism for trimming a workpiece, including trimming members with an open space therearound, and means movable in a circular path for transferring workpieces into line therewith; the combination therewith of means for intercepting the flight of chips formed by the action of the trimming members on the workpiece and directing the discharge thereof by gravitational movement, comprising in part a member surrounding one of the trimming members, projected into said open space and forming an arcuate wall around the point of trimming by the trimming members, and means for moving the member in relation to the trimming members when the transfer means is outside of said open space.

19. In combination with a trimming tool; of means for partially surrounding the working face thereof when trimming, comprising a guard surrounding one of the trimming members having an opening in one side below the working face; and means for moving the guard in relation to said working face, whereby in one of its positions the outer end thereof will be in a plane in front of said working face and in another of its positions in rear thereof.

20. The combination with a trimming tool; of means for transferring a workpiece to the trimming tool, means for partially surrounding the working face of the trimming tool when trimming, comprising a guard surrounding one of the trimming members having an opening in one side below the working face; means for moving the guard in relation to said working face, whereby in one position the outer end thereof will be in a plane in front of said working face, and in another position in rear thereof, and means for actuating the transfer means, whereby the workpiece will be presented to the trimming tool when the end of the guard is in rear of the said working face.

21. In combination with trimming tools; wall means partly surrounding the working faces of the trimming tools and in the path of chips severed from the workpiece by the trimming tools, comprising a sleeve having an opening in one side thereof below the trimming tools; and means for independently moving the sleeve in a path substantially parallel with the axis of the trimming tools.

22. Mechanism for trimming a workpiece, including trimming members with an open space therearound; means for transferring workpieces into line therewith, having a cam as a part thereof, the combination therewith; of means for intercepting the flight of chips, formed by the action of the trimming members on the workpiece and directing the discharge thereof by gravitational movement, comprising in part a member surrounding one of the trimming members, projected into said open space and forming an arcuate wall around the point of trimming by the trimming members; and means actuated by said cam for moving the member in relation to the trimming members when the transfer means is outside of said open space.

23. Mechanism for trimming a workpiece, including trimming members with an open space therearound, and means, as a rock member, for transferring workpieces into line therewith; the combination therewith of means for intercepting the flight of chips formed by the action of the trimming members in the workpiece and directing the discharge thereof by gravitational movement, comprising in part a member surrounding one of the trimming members, projected into said open space and forming an arcuate wall around the point of trimming by the trimming members, means, actuated from the said rock member, for moving the member in relation to the trimming members when the transfer means is outside of said open space, comprising in part a rock shaft or the like, an operative connection between the rock shaft and member whereby motion of the latter is derived from the former; and means for actuating the rock shaft in timed relation with the transfer means, whereby the member will be moved when the transfer means is outside of said open space.

24. In mechanism of the character described; a die block; a trimming tool therein; a second trimming tool, one trimming tool being movable toward and away from the other trimming tool, said trimming tools cooperating to trim a workpiece by cutting chips therefrom; guard means, partly surrounding the trimming tools adjacent to the point of severance of the chips, to limit the flight of said chips, said guard means providing for the escape of chips therefrom, a support for the guard means, and mechanism in part associated with the die block for moving the guard means relatively to the trimming tool therein in timed relation with the moving trimming tool, so that when the workpiece is being trimmed the guard means will be projected over the working faces of both trimming tools and spaced therefrom.

25. In mechanism of the character described; a die block; a trimming tool therein; chip guard means partly surrounding the trimming tool; and mechanism in part associated with the die block for moving the chip guard means relative to the trimming tool, so that in one of its positions the chip guard means will in part project beyond the working face of the trimming tool and in another of its positions will be in rear thereof.

26. In mechanism of the character described; a die block; a sleeve therein; a trimming tool within the sleeve; a chip guard or the like; and means for reciprocating the chip guard relative to the sleeve so that in one of its positions the chip guard will in part project beyond the working face of the trimming tool and in another of its positions will be in rear thereof.

RICHARD LESTER WILCOX.